United States Patent [19]

Suzuki

[11] 4,010,367
[45] Mar. 1, 1977

[54] THERMOGRAPHIC CAMERA

[75] Inventor: Koji Suzuki, Kawasaki, Japan

[73] Assignee: Canon Kabushiki Kaisha, Tokyo, Japan

[22] Filed: Dec. 11, 1975

[21] Appl. No.: 639,699

[30] Foreign Application Priority Data

Dec. 18, 1974 Japan .......................... 49-145199

[52] U.S. Cl. .............................. 250/334; 250/330
[51] Int. Cl.² ........................................ H01J 31/49
[58] Field of Search ........................... 250/330, 334

[56] References Cited
UNITED STATES PATENTS

| | | | |
|---|---|---|---|
| 3,798,366 | 3/1974 | Hunt et al. ..................... | 250/334 X |
| 3,830,970 | 8/1974 | Hurley et al. ................... | 250/330 X |
| 3,862,423 | 1/1975 | Kutas et al. ..................... | 250/334 X |
| 3,886,359 | 5/1975 | Cheek, Jr. et al. ................ | 250/334 |

Primary Examiner—Archie R. Borchelt
Attorney, Agent, or Firm—William R. Woodward

[57] ABSTRACT

In the present thermographic camera, an object is scanned by a horizontal and vertical scanning mechanisms in order to obtain temperature signals of each point on the object, and the temperature distribution of the object is indicated on a scanning display device, such as a cathode ray tube, on the basis of the signals obtained by the scanning. Temperature information of one or more arbitrary points on the object are sampled from each frame, and temperature variation of a point on the object is measured, while the identity of the point or points is marked on the temperature distribution display.

2 Claims, 9 Drawing Figures

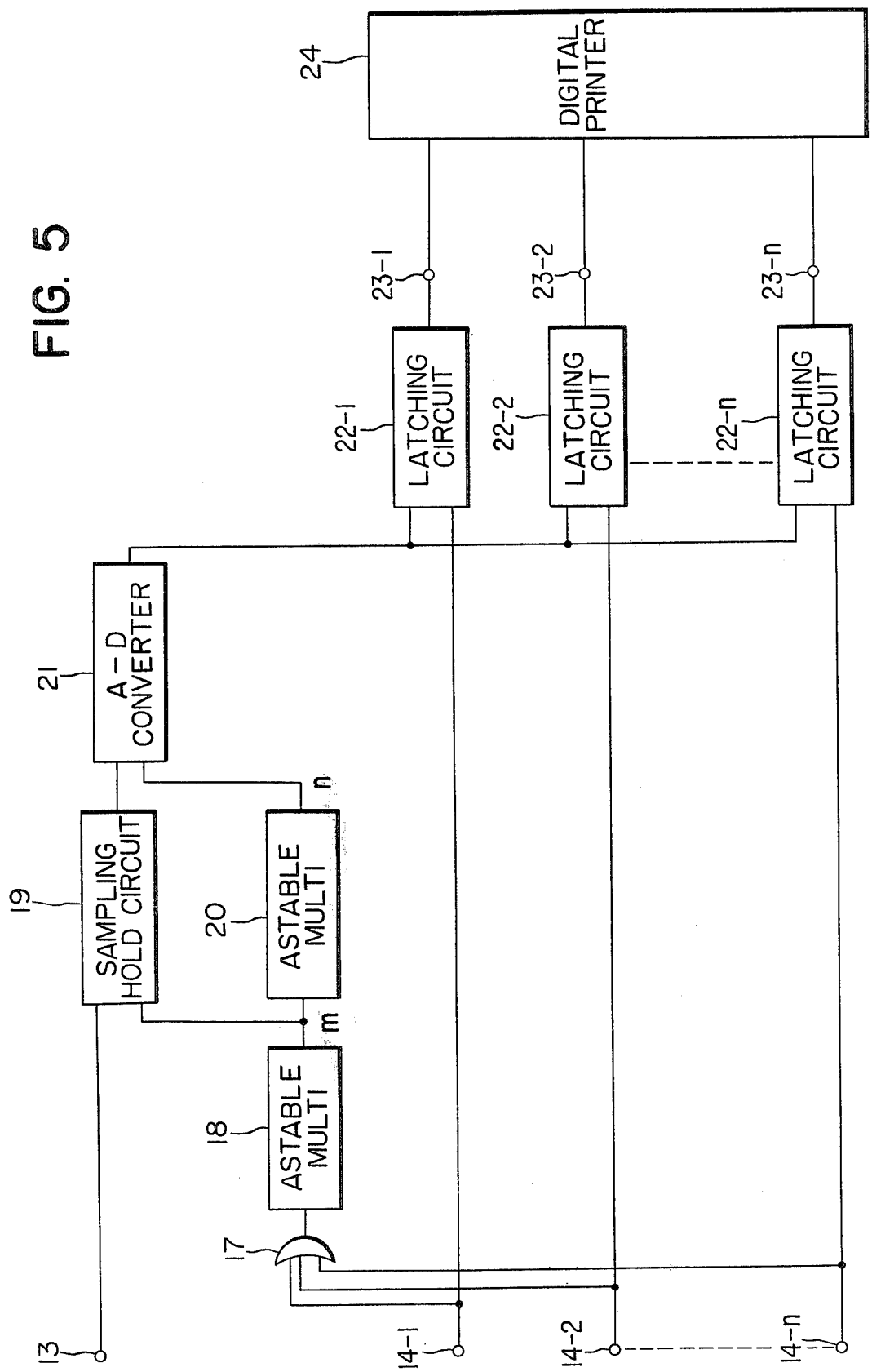

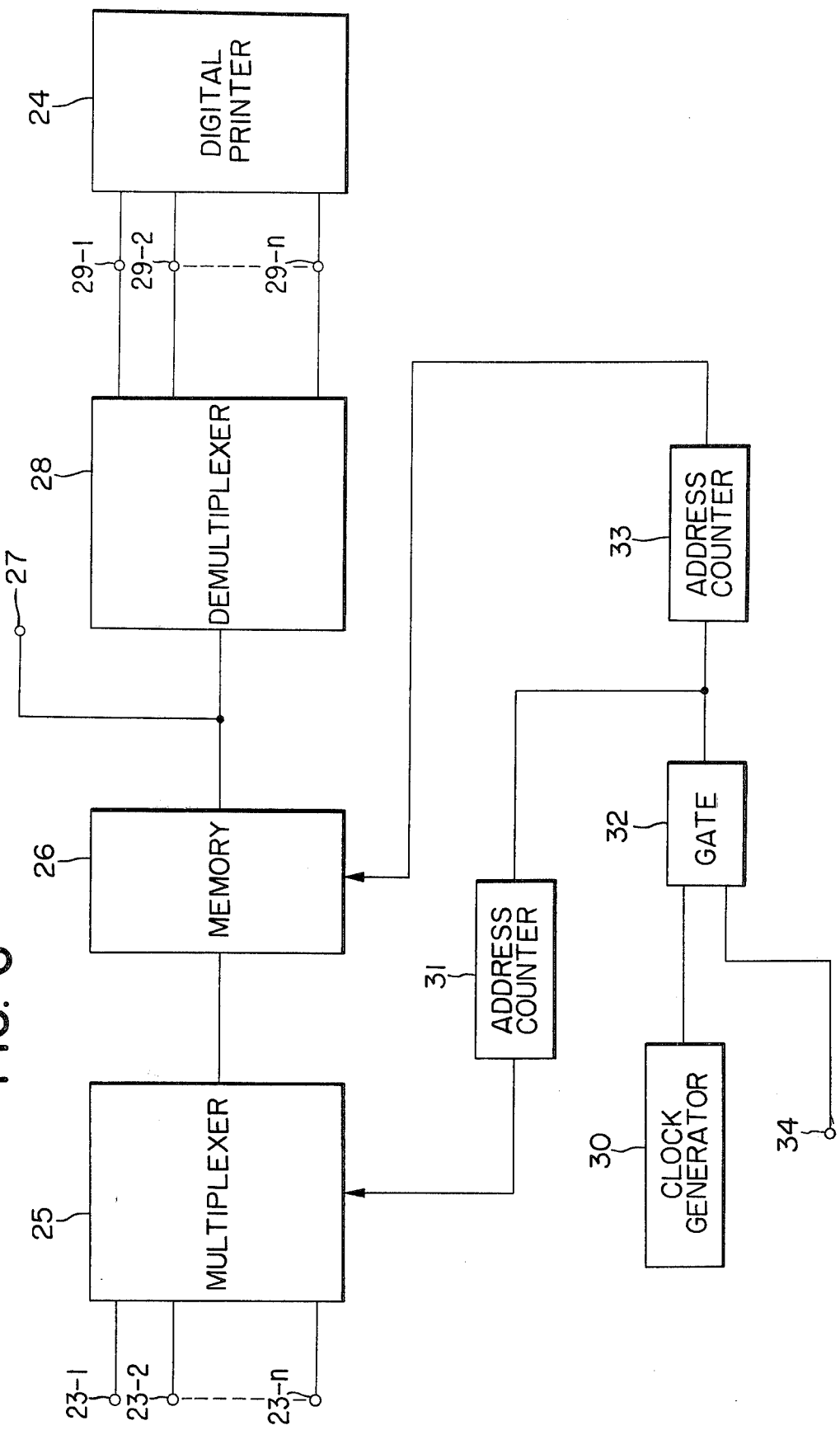

THERMOGRAPHIC CAMERA

BACKGROUND OF THE INVENTION

1. Field of the Invention

The present invention relates to a thermographic camera, and particularly to a thermographic camera capable of two-dimensionally scanning an object to observe temperature distribution thereof.

2. Description of the Prior Art

A thermographic camera capable of two-dimensionally scanning an object to find the temperature distribution on said subject is already known. For example there is already known a thermographic camera which utilizes a scanning mechanism, such as a rotary polygonal mirror, for horizontal scanning, a deflecting mirror for vertical scanning etc. for successively directing infrared light emitted from consecutive points of an object to an infrared detector and indicates the signals obtained by said infrared detector on a scanning indicator, such as a cathode ray tube, controlled by synchronizing signals synchronized with the operation of the scanning mechanisms.

In such thermographic camera, however, as the temperature distribution of the object is continuously shown on consecutive frame, it is difficult to compare the distribution on a frame with that on a succeeding frame, and it is also difficult to measure the time-dependent variation of temperature in a particular point on the object.

SUMMARY OF THE INVENTION

The object of the present invention is to provide a thermographic camera free from the above-mentioned drawback.

The above-mentioned object of the present invention can be achieved by sampling the temperature information of an arbitrary point on the object from each frame and comparing thus sampled values.

BRIEF DESCRIPTION OF THE DRAWINGS

FIG. 5 and FIG. 6 show variation of the apparatus shown in FIG. 3.

DESCRIPTION OF THE PREFERRED EMBODIMENTS

A preferred embodiment of the present invention is explained in the following with particular reference to the attached drawings.

Figure 1:
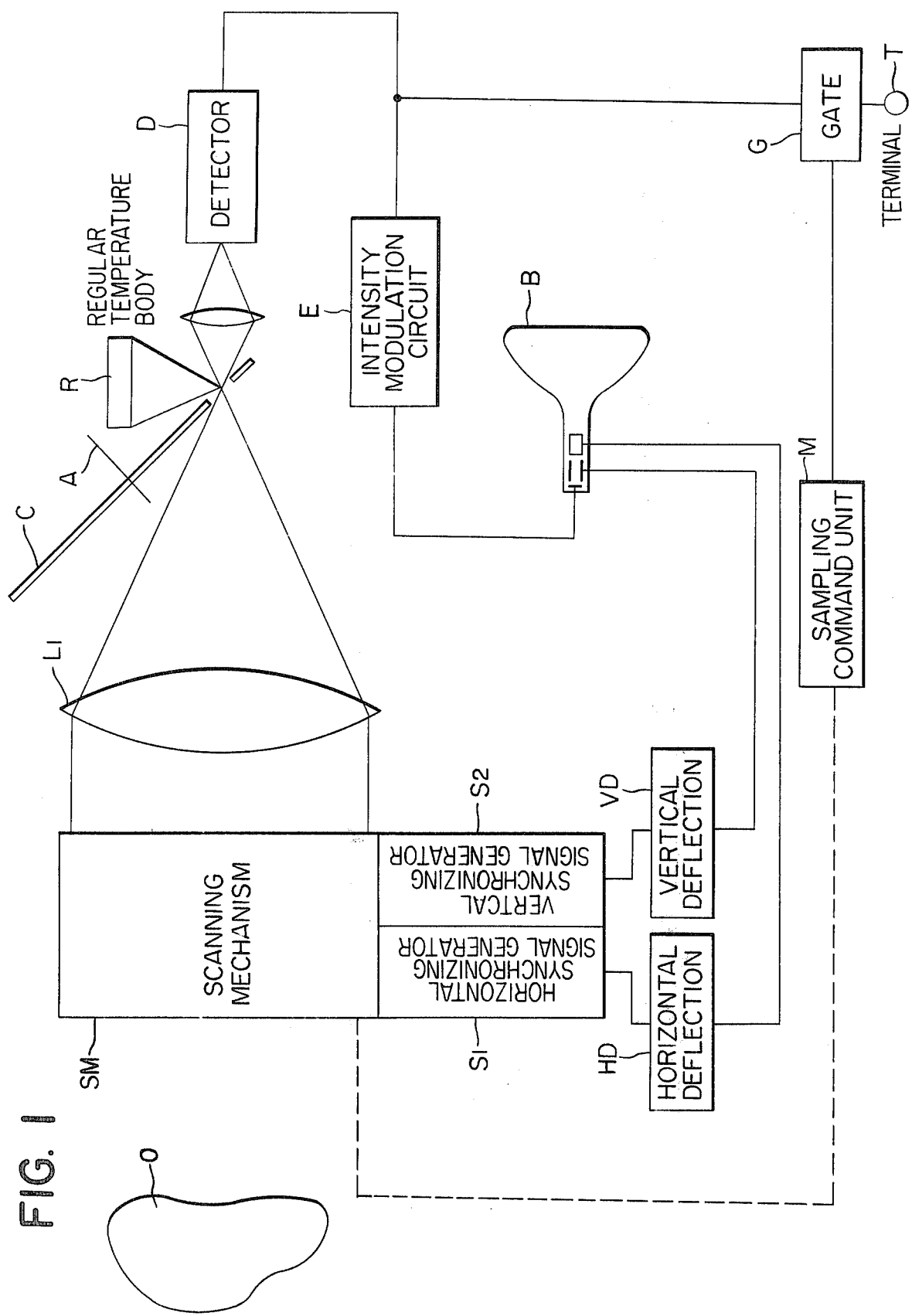
FIG. 1 is a diagram showing an embodiment of the thermographic camera of the present invention.
Figure 2B:
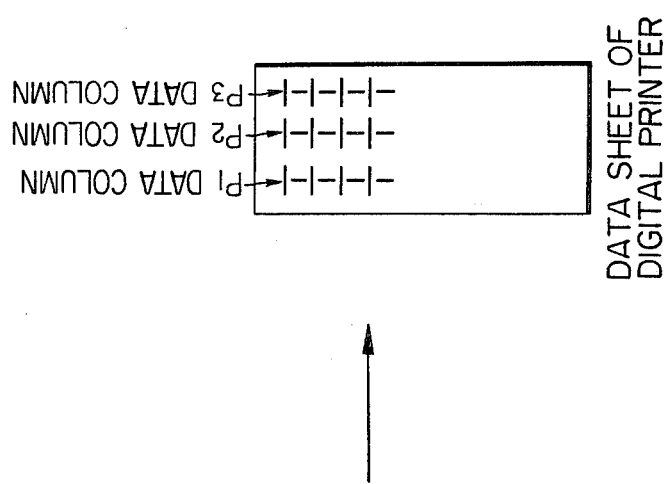
FIG. 2(b) is an illustration of a typical data print-out of successive temperature measurements at selected points identified in FIG. 2(a)
Figure 2A:
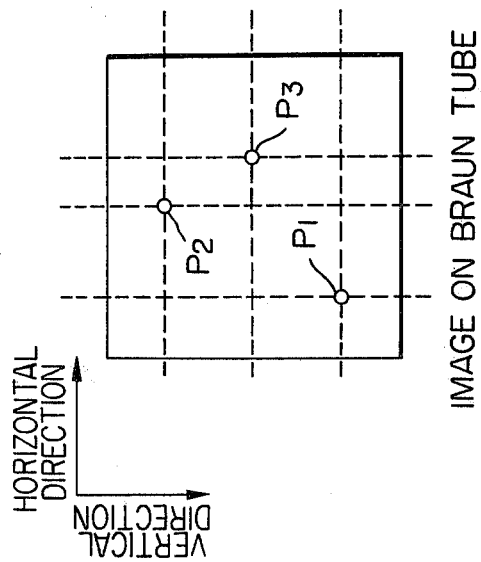
FIG. 2(a) is a drawing showing the face of the cathode ray tube indicated in FIG. 1.

Referring to FIG. 1, an object O is scanned by a two-dimensional scanning mechanism SM consisting of a combination of a rotary polygonal mirror for horizontal scanning and a deflecting mirror for vertical scanning. Detailed explanation is omitted as such two-dimensional scanning mechanism is already disclosed for example in U.S. Pat. No. 3,604,932. There is provided a lens $L_1$ for forming a space image of temperature distribution of said object O. C indicates a chopper which is provided with an opening on the surface where said space image is formed and which is rotated around the axis thereof. R and $L_2$ indicate a standard temperature body and a relay lens, respectively. D indicates an infrared detector which detects the temperature on each point on said object in comparison with a standard temperature, and of which output signal is supplied to a scanning indicator B, such as a cathode ray tube, through an already known electric circuit E, such as a intensity modulating circuit. There are provided a horizontal synchronizing signal generator $S_1$ for generating signals in synchronization with the rotation of said rotary polygonal mirror and a vertical synchronizing signal generator $S_2$ for generating signals in synchronization with the vibration of said deflecting mirror, said signals being supplied to said indicator B respectively through a horizontal deflection circuit HD and a vertical deflection circuit VD, thereby realizing an indication of temperature distribution of said object O on said indicator B. In such apparatus where the temperature distribution of object O is indicated for each frame consisting of a complete cycle of horizontal and vertical scanning, it is possible to compare the temperatures of different points on the object O at a time but not the time-dependent temperature variation of a same point on said object O. However, measurement of such time-dependent change of temperatures is rendered possible by sampling the temperature information of the arbitrary points $P_1$, $P_2$, $P_3$ etc. on the temperature distribution image indicated on the cathode ray tube as shown in FIG. 2(a) and by digitally indicating the successive magnitudes of samples from the selected point on a data sheet as shown in FIG. 2(b).

Figure 3:
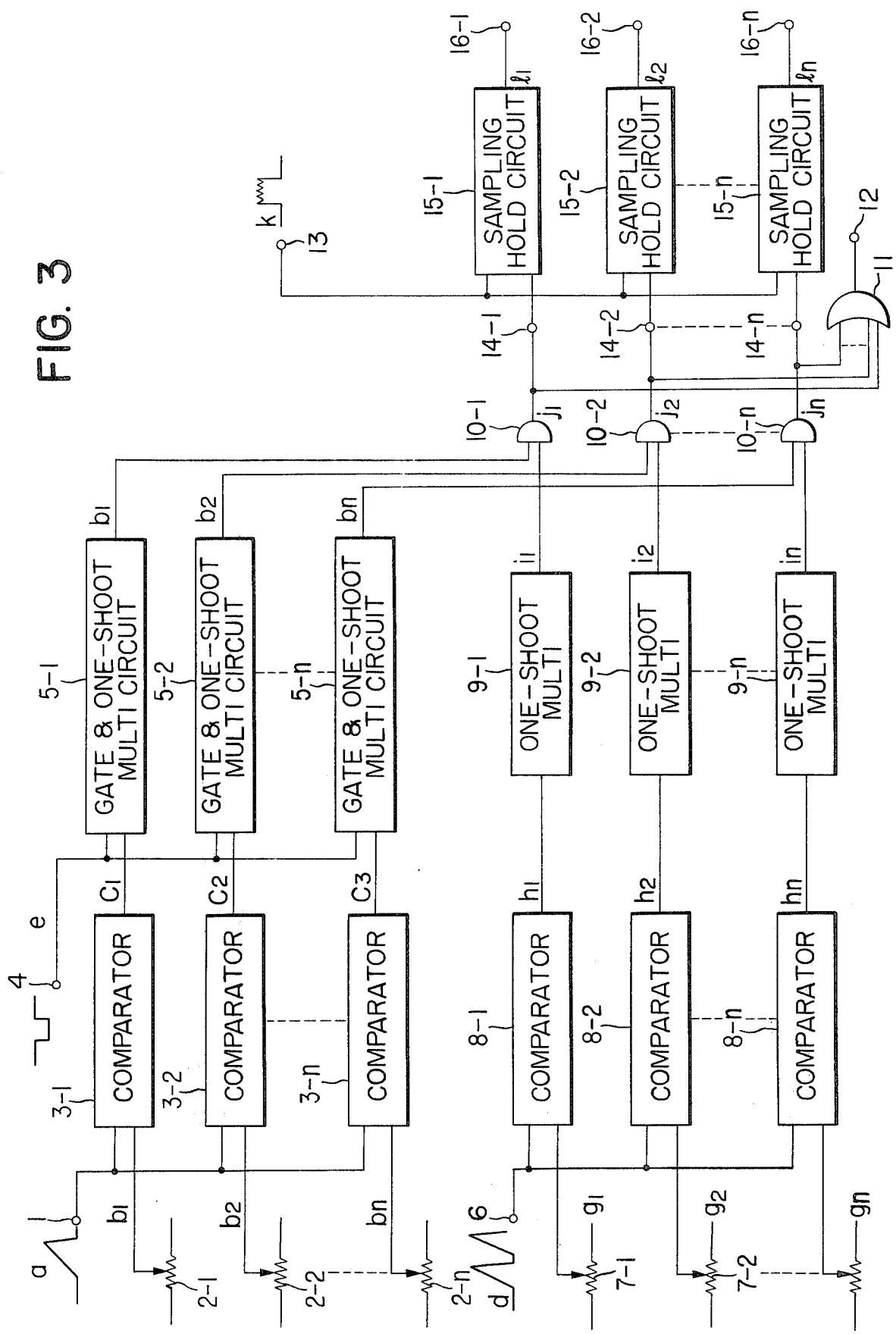
FIG. 3 shows an example of the sampling command unit shown in FIG. 1.

For this purpose the apparatus shown in FIG. 1 is further provided with a sampling command unit M and a gate G for passing the signal from said infrared detector D upon receipt of an instruction signal from said sampling command unit M. Said sampling command unit M generates sampling instruction signals when said two-dimensinal scanning mechanism SM is in the positions corresponding to the selected points $P_1$, $P_2$ and $P_3$ of the object O, and, upon receipt of said instruction signals the gate G is opened to release from the terminal T thereof the temperature signals of said points $P_1$, $P_2$ and $P_3$ which are digitalized and printed to obtain the data sheet of FIG. 2(b). In FIG. 3 there is shown in detail an example of the sampling compound unit M which forms sampling instruction signals from horizontal and vertical deflecting signals generated respectively by said horizontal and vertical deflecting circuits HD and VD shown in FIG. 1.

Figure 4A:
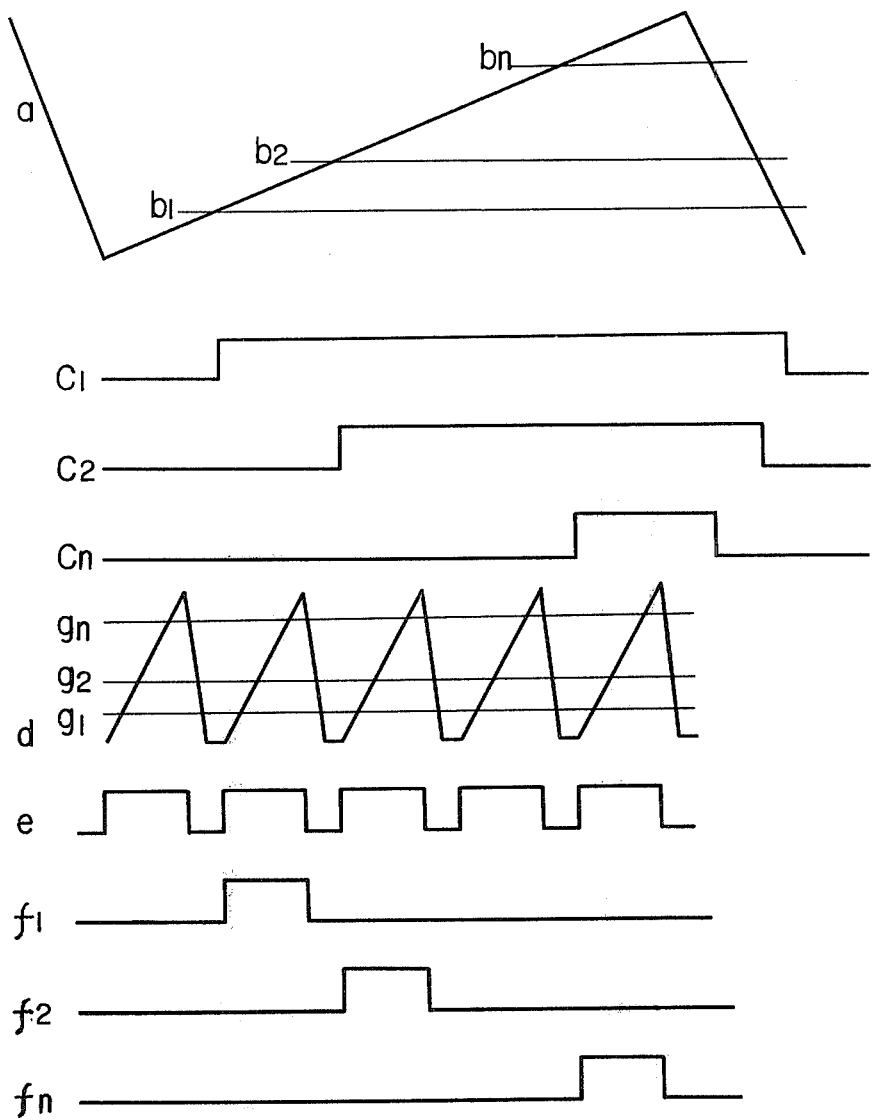
FIG. 4A is a time chart relating to the derivation of a first set of signals relating to the coordinates of selected points in the apparatus of FIG. 3.

Referring to FIG. 3, the vertical deflecting signal (FIG. 4a) from the vertical synchronizing signal generator shown in FIG. 1 is supplied to a terminal 1. There are provided variable resistors 2-1, 2-2, . . ., 2-n for selecting vertical positions, which generate standard signals $b_1$, $b_2$, ...,$b_n$ of determined voltage levels corresponding to the positions in vertical direction of selected points, these voltage levels being correlated with the vertical deflecting signal $a$. Comparators 3-1, 3-2, . . ., 3-n receive said vertical deflecting signal $a$ and said standard signals $b$, and release comparison output signals $c$ when the voltage of the vertical deflecting signal becomes higher than that of the standard signals, i.e., when and after a horizontal scanning line containing a selected point on the object O is scanned. A terminal 4 receives a blanking signal $e$ which is obtained by processing said horizontal deflecting signal with an already known electric circuit. Circuits 5-1, 5-2, . . ., 5-n respectively consisting of an AND gate and a one-shot multi-vibrator respectively receive the comparison output signals $c$ from the comparators 3 and said blanking signals $e$ to generate, upon reception of both these signals, vertical position instruction signals $f$ of a pulse width corresponding to a horizontal scanning time as shown in FIG. 4f, which are supplied to AND gates 10 explained later.

Aforementioned horizontal deflecting signal $d$ is supplied to an input terminal 6 and further to comparators 8-1, 8-2, . . ., 8-n which also receive the signals $g$ from variable resistors 7-1, 7-2, . . ., 7-n for selecting the positions in horizontal direction of selected points on the object O. In this manner the comparators 8 generate comparison output signals $h$ on each horizontal scanning line. At the beginning of each of the comparison output signals pulse signals $i$ of extremely short duration are generated by one-shot multi-vibrators 9-1, 9-2, . . ., 9-n.

The output signals $f$ and $i$ of aforementioned circuits 5 and one-shot multi-vibrators 9 are supplied to AND gates 10-1, 10-2, . . ., 10-n to provide output signals $j$ corresponding to the positions of selected points on the object O.

The temperature information of arbitrarily selected points on the object O can be obtained by supplying the output signals $j$ to input terminals of AND circuits (not shown), of which the other input terminals are supplied with the output signal $k$ of the infrared detector. The time-dependent variation of the selected points can thus be measured by connecting said temperature information $l$ to a suitable recording apparatus, such as a pen recorder. It is also possible to memorize the temperature information in a sample hold circuit and then to read thus memorized information as shown in FIG. 3, wherein the output signal $k$ of the infrared detector is supplied to an input terminal 13. There are provided sample hold circuits 15-1, 15-2, . . ., 15-n which receive the output signal $j$ of aforementioned AND circuits 10 through connecting terminals 14-1, 14-2, . . ., 14-n to open the gates therein, thereby sampling and holding the output signal $k$. The sample signals thus maintained are released as output signals $l$ from output terminals 16 upon receipt of readout signals supplied to readout instruction signal input terminals (not shown). Thus, the temperature information of the arbitrarily selected points on the object O can be recorded for each frame by connecting a recording apparatus, such as a pen recorder, to the output terminal 16 and generating the readout instruction signals for each frame.

Furthermore, it is possible to marking of the selected points over the indication of temperature distribution of the object O, by connecting said AND circuits 10 to OR circuits 11 and further connecting output terminals thereof to an input terminal of the cathode ray tube shown in FIG. 1. In this manner the positions of the points to be observed can be easily selected on the object O by adjusting the variable resistors 2 and 7 while observing the resulting markings of observed points and the temperature distribution indicated on the indicator.

FIG. 5 shows a variation of a control circuit of a recording apparatus to be additionally connected to the apparatus shown in FIG. 3, wherein 17 is an OR gate of which input terminals are connected to the input terminals 14-1, 14-2, . . ., 14-n, 18 is monostable multi-vibrator, 19 is a sample hold circuit, 20 designates monostable multi-vibrator, 21 designates an analogdigital converter, 22-1, 22-2, . . ., 22-n designates latch circuits, 23-1, 23-2, . . ., 23-n are output terminals, and 24 is a digital printer.

Figure 4:
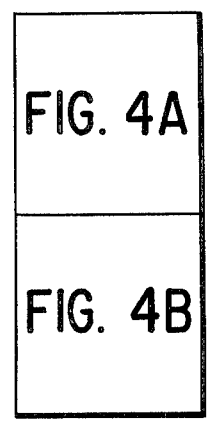
FIG. 4 is a block diagram indicating that FIG. 4A and FIG. 4B have a common horizontal time scale.
Figure 4B:
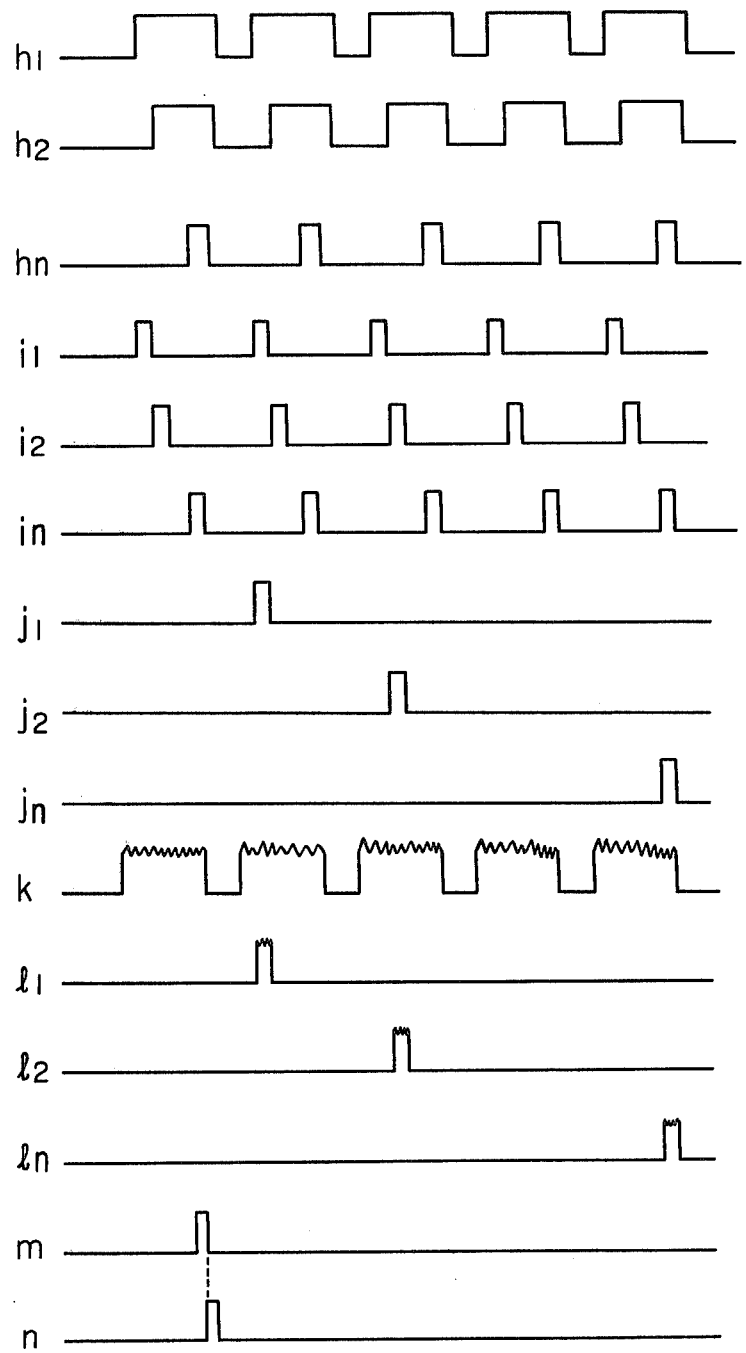
FIG. 4B is a time chart showing the drrivation from said first set of signals of sampling instruction signals and of sample signals in the apparatus shown in FIG. 3.

The synchronizing signals obtained at the terminals 14 corresponding to the measurements are converted into a serial pulse train by the OR gate 17 to trigger the monostable multi-vibrator 18 which produces, in synchronization with the beginning of the pulses $j$ shown in FIG. 4, the pulses $m$ of short duration to be supplied to the sample hold circuit 19 as sampling pulses. On the other hand the monostable multi-vibrator 20 produces, in synchronization with the ending of said pulses $m$, the pulses $n$ of short duration which are supplied to said analog-digital converter 21 as converting instruction signals. In this manner the amplitude component to be measured is extracted by said sample hold circuit 19 from the image signals supplied to the terminal 13, then maintained therein until the application of succeeding sampling pulse, further converted by the analog-digital converter 21 to digital signals and supplied to the latch circuit 22 which converts serial signals into parallel signals, wherein the pulse width of said pulses j are so selected that the pulses j are terminated directely after the completion of conversion by the analog-digital converter caused by the application of pulses $n$ thereto. In this manner the latch circuit 22 starts the read-in of the output of analog-digital converter 21 at the beginning of a pulse $j$ and holds the output until the beginning of a succeeding pulse $j$.

Thus, digitally converted temperature information of selected points is supplied to the terminals 23 and supplied to the parallel input terminals of the printer 24 for recording in print.

FIG. 6 shows a variation wherein a large capacity memory is connected to the printer circuit of FIG. 5 to temporarily memorize temperature information of a plurality of selected points for printing afterwards, thereby enabling the measurements of a large amount of temperature information irrespective of the frame time.

In FIG. 6 the terminals 23-1, 23-2, . . ., 23-n are respectively connected to the latch circuits 22-1, 22-2, . . ., 22-n shown in FIG. 3.

A multiplexer 25 converts the $n$ parallel data selected in a frame into serial data and supplies thus converted data to a memory 26, which is composed for example of a wire memory, IC memory, core memory, etc. 30 designates a clock generator for generating signals for the multiplexer 25 and for addressing of the memory 26. 32 designates a gate circuit which performs a gate action to supply $n$ pulses to the address counters 31 and 32 during the blanking period caused by the application of a vertical blanking pulse to the terminal 34. 28 designates a demultiplexer which converts the serial output signals of the memory 26 into parallel signals to be applied to a parallel input digital printer. The readout of the temperature information from the memory 26 is carried out by suitable addressing so as to match the printing speed and input digit numbers of the digital printer. Furthermore, the temperature information memorized in the memory 26 can be connected through a terminal 27 to a computer or other processing unit.

As thus far explained, the present invention enables the measurements of time-dependent variation of temperature in a plurality of arbitrarily selected points with simultaneous indication of positions of such points on a graphic image, and thus is extremely convenient for use and capable of providing exact data.

What is claimed is:

1. A thermographic camera comprising:
  a scanning mechanism for two-dimensionally scanning an object on a frame by frame basis;
  an infrared detector for detecting infrared light from said scanning mechanism, and
  a two-dimensional scanning display device for displaying detection signals, as temperature information, from said infrared detector,
  wherein there is made the improvement consisting of the provision, in said camera, of:
  sampling command means for generating in every frame sampling instruction signals, whenever respective points of a previously selected plurality of points on the object, distributed in any desired way over the aspect of the object, are scanned by said scanning mechanism;
  sampling means for sampling the detection signals from said infrared detector in response to said sampling instruction signals generated by said sampling command means; and
  means for indicating information corresponding to successive samples for/of each of said points, segregated from other information contained in said detection signals.

2. A thermographic camera according to claim 1 wherein means are provided, responsive to the instruction signals from said sampling command means, for supplying to said scanning display device signals for superimposing visual identification of said points on the indication of the temperature distribution of said object.

* * * * *